US009928788B2

(12) United States Patent
Kim et al.

(10) Patent No.: US 9,928,788 B2
(45) Date of Patent: Mar. 27, 2018

(54) LIQUID CRYSTAL DISPLAY DEVICE

(71) Applicant: Samsung Display Co. Ltd., Yongin-si (KR)

(72) Inventors: Sung Man Kim, Seongnam-si (KR); Min Chul Song, Suwon-si (KR); Jun Ho Song, Seongnam-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/205,910

(22) Filed: Jul. 8, 2016

(65) Prior Publication Data

US 2017/0178579 A1  Jun. 22, 2017

(30) Foreign Application Priority Data

Dec. 22, 2015 (KR) .................. 10-2015-0183534

(51) Int. Cl.
| | |
|---|---|
| *G02F 1/1337* | (2006.01) |
| *G09G 3/36* | (2006.01) |
| *G02F 1/1362* | (2006.01) |
| *G02F 1/1343* | (2006.01) |

(52) U.S. Cl.
CPC ..... *G09G 3/3614* (2013.01); *G02F 1/133707* (2013.01); *G02F 1/136286* (2013.01); *G02F 2001/133757* (2013.01); *G02F 2001/134372* (2013.01)

(58) Field of Classification Search
CPC ......... G02F 1/134363; G02F 1/134309; G02F 1/136286; G02F 2001/134372; G02F 1/133707; G09G 3/3614
See application file for complete search history.

(56) References Cited

U.S. PATENT DOCUMENTS

| | | | |
|---|---|---|---|
| 2007/0103613 A1* | 5/2007 | Song | ............ H01L 27/124 349/43 |
| 2007/0296898 A1* | 12/2007 | Cho | ............ G02F 1/134336 349/139 |

FOREIGN PATENT DOCUMENTS

| | | |
|---|---|---|
| JP | 2009103797 | 5/2009 |
| JP | 2014048360 | 3/2014 |

* cited by examiner

*Primary Examiner* — James Dudek
(74) *Attorney, Agent, or Firm* — Cantor Colburn LLP

(57) ABSTRACT

A liquid crystal display includes a first gate line and a second gate line extending in a first direction, first to fourth data lines extending in a second direction perpendicularly intersecting the first direction, and a plurality of pixels connected respectively to either the first or second gate line and any one of the first to fourth data lines, where each of the pixels includes a pixel electrode which receives a data signal from the connected one of the first to fourth data lines, a region in which the pixel electrode is disposed includes a first domain and a second domain having average alignment directions of liquid crystal molecules different from each other, and the first gate line overlaps a boundary between the first domain and the second domain.

24 Claims, 13 Drawing Sheets

LIQUID CRYSTAL DISPLAY DEVICE

This application claims priority to Korean Patent Application No. 10-2015-0183534, filed on Dec. 22, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display device.

2. Description of the Related Art

A liquid crystal display ("LCD") has been widely applied to various fields such as a notebook computer, a monitor, and a spacecraft/aircraft display due to its advantages such as low operating voltage, low power consumption and portability.

In general, an LCD includes an array substrate which displays an image by using light transmittance of liquid crystals, an opposing substrate facing the array substrate, and a light assembly which provides light to the array substrate and the opposing substrate. The LCD includes pixels representing different colors, and displays a specific color by a combination of colors represented by the pixels. In general, pixels may represent red, green and blue colors, and may display various colors by a combination of these three colors.

SUMMARY

To drive the pixels, a data line and a gate line are connected to each of pixels. Since the data line and the gate line include opaque metal, transmittance of a liquid crystal display ("LCD") decreases as an area with the data line or the gate line disposed therein increases.

Therefore, it is desired for a structure in which a decrease in transmittance caused by the data line or the gate line is minimized.

An exemplary embodiment of the invention provides an LCD device in which a decrease in transmittance caused by a data line or a gate line is minimized.

According to an exemplary embodiment of the invention, there is provided an LCD device. The LCD device includes a first gate line and a second gate line extending in a first direction, first to fourth data lines extending in a second direction perpendicularly intersecting the first direction, and a plurality of pixels connected respectively to either the first or second gate line and any one of the first to fourth data lines, where each of the pixels includes a pixel electrode which receives a data signal from the connected one of the first to fourth data lines, a region in which the pixel electrode is disposed includes a first domain and a second domain having average alignment directions of liquid crystal molecules different from each other, and the first gate line overlaps a boundary between the first domain and the second domain.

According to another exemplary embodiment of the invention, there is provided an LCD device. The LCD device includes a plurality of gate lines extending in a first direction, a plurality of data lines extending in a second direction perpendicularly intersecting the first direction, and a plurality of pixels connected respectively to the gate lines and the data lines, where the pixels include pixel electrodes which receive data signals from the data lines, a region in which the pixel electrodes are disposed includes a first domain and a second domain having average alignment directions of liquid crystal molecules different from each other, and at least one of the plurality of gate lines overlaps a boundary between the first domain and the second domain.

However, embodiments of the invention are not restricted to those set forth herein. The other embodiments of the invention which are not mentioned herein will become more apparent to a person skilled in the art to which the invention pertains by referencing the detailed description of the invention given below.

According to an exemplary embodiment of the invention, there is provided an LCD device in which a decrease in transmittance caused by a data line or a gate line is minimized.

However, effects of the invention are not restricted to the exemplary embodiments set forth herein and more diverse effects are included in this description.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Figure 1:
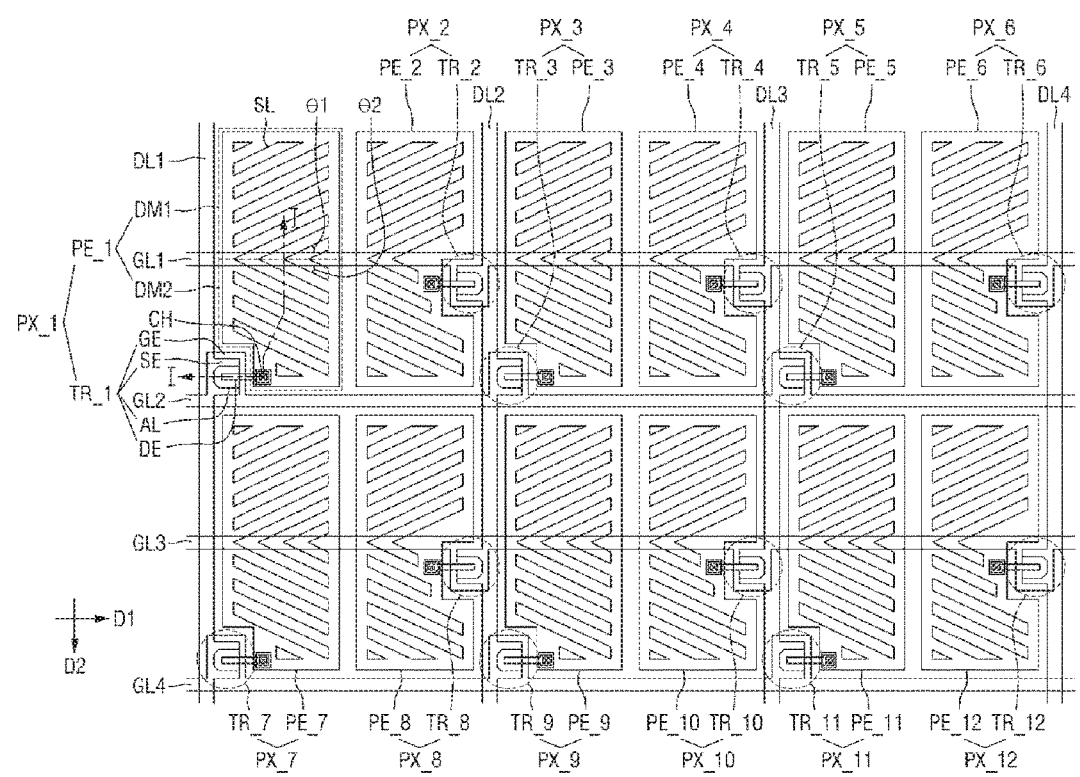
FIG. 1 is a plan view of an exemplary embodiment of a part of pixels of a liquid crystal display ("LCD") device according to the invention.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this invention will be thorough and complete, and will fully convey the scope of the invention to those skilled in the art.

The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In an exemplary embodiment, "about" can mean within one or more standard deviations, or within +30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 2:
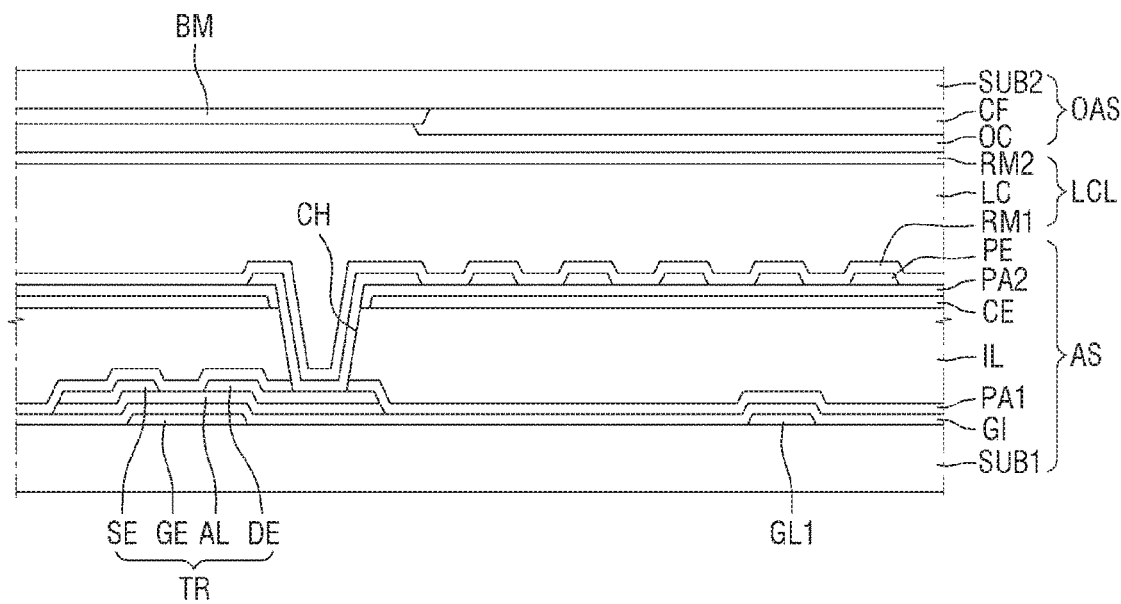
FIG. 2 is a cross-sectional view taken along line I-I' of FIG. 1.
Figure 3:
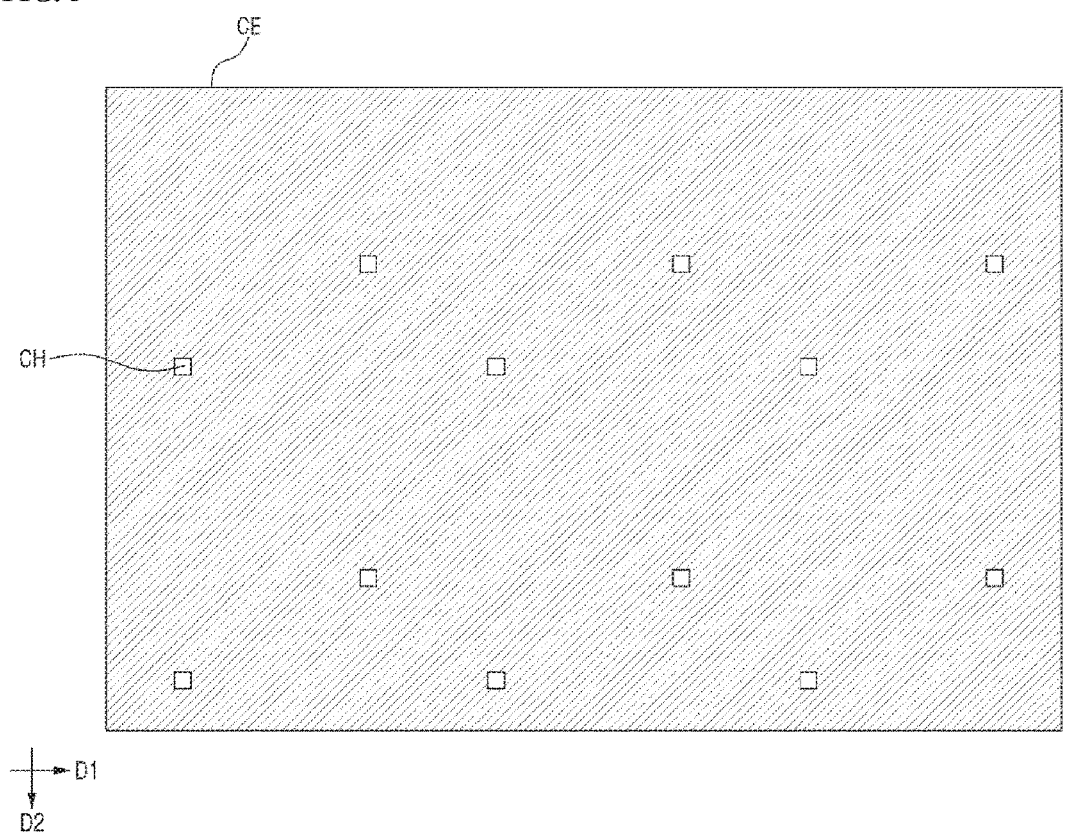
FIG. 3 is a plane view illustrating a common electrode of the part of the pixels shown in FIG. 1.
Figure 4:
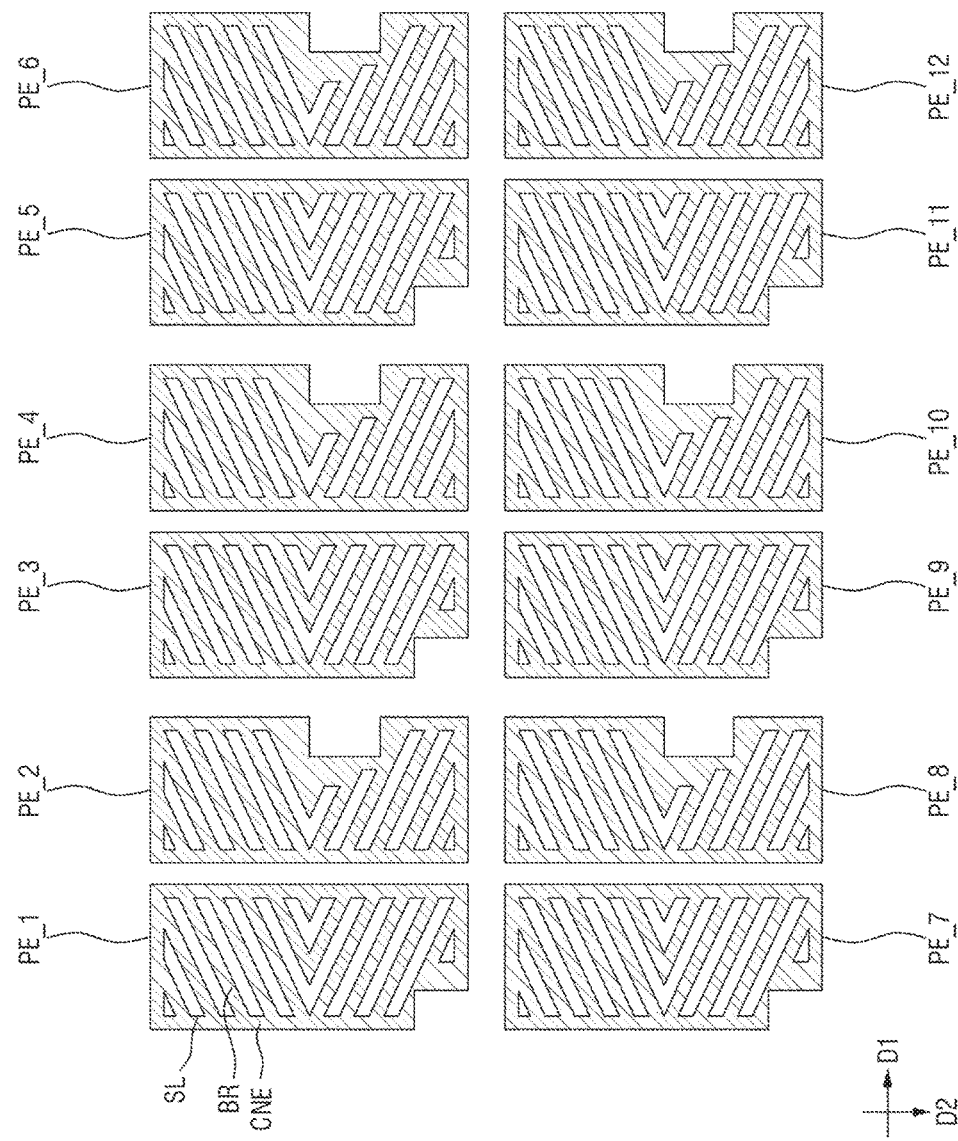
FIG. 4 is a plane view illustrating pixel electrodes of the part of the pixels shown in FIG. 1.

FIG. 1 is a plan view of a part of pixels of a liquid crystal display ("LCD") device according to an exemplary embodiment of the invention. FIG. 2 is a cross-sectional view taken along line I-I' of FIG. 1. FIG. 3 is a plane view illustrating a common electrode of the part of the pixels shown in FIG. 1. FIG. 4 is a plane view illustrating pixel electrodes of the part of the pixels shown in FIG. 1.

Referring to FIGS. 1 to 4, an LCD device according to an exemplary embodiment of the invention includes an array substrate AS, an opposing substrate OAS, and a liquid crystal layer LCL.

Transistors for driving liquid crystal molecules of the liquid crystal layer LCL may be disposed on the array substrate AS, and the opposing substrate OAS may be disposed to face the array substrate AS.

The array substrate AS will hereinafter be described.

The array substrate AS may include a first base substrate SUB1. The first base substrate SUB1 may be a transparent insulation substrate. In an exemplary embodiment, the first base substrate SUB1 may be a glass substrate, a quartz substrate, a transparent resin substrate and the like, for example. In an exemplary embodiment, the first base substrate SUB1 may include polymers or plastics with high heat resistance, for example. The first base substrate SUB1 may be flat, but may be curved in a specific direction.

The first base substrate SUB1 may have flexibility. That is, the first base substrate SUB1 may be a transformable substrate which may be rolled, folded or bent.

A gate line (e.g., GL1, GL2, GL3 or GL4) and a gate electrode GE may be disposed on the first base substrate SUB1. The gate line may transmit a gate signal and extend in a first direction D1.

The first direction D1 may extend in parallel to one side of the first base substrate SUB1, and may be defined as a direction indicated by a predetermined straight line extending from the left to the right as shown in FIG. 1. However, the invention is not limited thereto, and the first direction D1 may not necessarily be parallel to one side of the first base substrate SUB1, and may be a direction indicated by a predetermined straight line extending in a specific direction on the first base substrate SUB1.

The gate signal may have a variable voltage value provided from an external source, and on/off operation of a transistor TR, which will be described later, may be controlled in correspondence to the voltage value of the gate signal.

The gate electrode GE may have a shape protruding from the gate line, and may be a component constituting the transistor, which will be described later. A plurality of gate electrodes GEs may extend from a gate line.

In an exemplary embodiment, the gate line and the gate electrode GE may include aluminum-based metal such as aluminum (Al) or aluminum alloy, silver-based metal such as silver (Ag) or silver alloy, copper-based metal such as copper (Cu) or copper alloy, molybdenum-based metal such as molybdenum (Mo) or molybdenum alloy, chrome (Cr), tantalum (Ta), titanium (Ti) and the like. The gate line and the gate electrode GE may have a single layer structure, or a multi-layer structure including at least two conductive layers having different physical properties. In an exemplary embodiment, one among at least two conductive layers may include low-resistance metal, for example, aluminum-based metal, silver-based metal, copper-based metal and the like so as to reduce a signal delay or voltage drop. In an exemplary embodiment, the other conductive layer may include a different material, specifically, a material having superior contact characteristics with indium tin oxide ("ITO") and indium zinc oxide ("IZO"), for example, molybdenum-based metal, chrome (Cr), titanium (Ti), tantalum (Ta) and the like. An example of such a combination may include a lower chrome layer and an upper aluminum layer, and a lower aluminum layer and an upper molybdenum layer. However, the invention is not limited thereto, and the gate line and the gate electrode GE may include various metal and conductors.

A gate insulation layer GI may be disposed on the gate line and the gate electrode GE. The gate insulation layer GI may include an insulation material, for example, silicon nitride, silicon oxide or the like. The gate insulation layer GI may have a single layer structure, or a multi-layer structure including two insulation layers having different physical properties.

A semiconductor layer AL may be disposed on the gate insulation layer GI. The semiconductor layer may at least partially overlap the gate electrode GE. The semiconductor layer AL may include amorphous silicon, polycrystalline silicon or an oxide semiconductor.

Although not shown in the drawings, ohmic contact members (not shown) may further be disposed on the semiconductor layer AL. The ohmic contact members (not shown) may include n+ hydrated amorphous silicon or the like, which is highly doped with n-type impurities, or including silicide. The ohmic contact members (not shown) may be disposed in pairs on the semiconductor layer AL. When the semiconductor layer is an oxide semiconductor, the ohmic contact members (not shown) may be omitted.

A data line (e.g., DL1, DL2, DL3 or DL4), a source electrode SE, and a drain electrode DE may be disposed on the semiconductor layer AL and the gate insulation layer GI.

The data line may extend in a second direction D2 so as to intersect the gate line.

The second direction D2 may perpendicularly intersect the first direction D1, and may be a direction indicated by a predetermined straight line extending from the top to the bottom as shown in FIG. 1. However, the invention is not limited thereto, and an angle defined between the second direction D2 and the first direction D1 may not be a right angle, and in this case, the second direction D2 may be a direction indicated by a predetermined straight line extending in a direction which is not parallel to the first direction D1.

The data line may be insulated from the gate line by the gate insulation layer GI.

The data line may provide the data signal input from an external source to the source electrode SE. In this case, the data signal may have a variable voltage value provided from the external source, and the gray level of each pixel may be controlled in correspondence to the data signal.

The source electrode SE may be branched and protruded from the data line. The source electrode SE may receive the data signal provided thereto from the data line.

The drain electrode DE may be spaced apart from the source electrode SE. As shown in FIG. 1, the source electrode SE may have a U-shape enclosing the drain electrode DE with predetermined spacing therebetween. However, shapes of the source electrode SE and the drain electrode DE are not limited thereto, and the source electrode SE and the drain electrode may be arranged into various shapes such that a part of the source electrode SE and a part of the drain electrode DE are spaced apart from each other with predetermined spacing therebetween.

A semiconductor layer AL may be disposed in a region provided between the drain electrode DE and the source electrode SE. That is, the drain electrode DE and the source electrode SE may partially overlap the semiconductor layer AL, or may face each other with the semiconductor layer AL therebetween such that the drain electrode DE and the source electrode SE contact the semiconductor layer AL.

The data line, the source electrode SE and the drain electrode DE may include aluminum, copper, silver, molybdenum, chrome, titanium, tantalum and an alloy thereof, and may have a multi-layer structure including a lower layer (not shown) of refractory metal and the like and a low resistance upper layer (not shown) disposed on the lower layer.

The gate electrode GE, the source electrode SE and the drain electrode DE may cooperate with the semiconductor layer AL so as to provide a transistor TR. In an exemplary embodiment, the transistor TR may be a thin film transistor ("TFT"), for example.

The transistor TR may electrically connect the source electrode SE and the drain electrode DE in correspondence to the voltage of the gate signal provided to the gate electrode GE. Specifically, when the voltage of the gate signal provided to the gate electrode GE is the one that turns off the transistor TR, the source electrode SE and the drain electrode DE may not be electrically connected. On the contrary, when the voltage of the gate signal provided to the gate electrode GE is the one that turns on the transistor TR, the source electrode SE and the drain electrode DE may be electrically connected through a channel defined in the semiconductor layer AL interposed between the source electrode SE and the drain electrode DE.

The channel may be defined centered around a region of the semiconductor layer AL between the source electrode SE and the drain electrode DE. That is, when the TFT is in a turned-on state, the channel may be defined centered around the semiconductor layer AL interposed between the source electrode SE and the drain electrode DE, and voltages may be transferred and current may flow along the channel.

Resultantly, the data signal provided to the data line may be transmitted to other components existing outside the transistor TR through the drain electrode DE, and whether to transmit the data signal may be controlled by the gate signal provided to the gate line.

A first passivation layer PA1 may be disposed on the gate insulation layer GI and the TFT. In an exemplary embodiment, the first passivation layer PA1 may include an inorganic insulation material, and may cover the transistor TR.

A protective layer IL may be disposed on the first passivation layer PA1. In exemplary embodiments, the protective layer IL may have a function of planarizing an upper surface of the first passivation layer PA1. The protective layer IL may include an organic material. In an exemplary embodiment, the protective layer IL may include a photosensitive organic composition.

A contact hole CH which exposes a part of the TFT, more specifically, a part of the drain electrode DE, may be defined in the protective layer IL and the first passivation layer PA1. The contact hole CH may be vertically penetrated through the protective layer IL and the first passivation layer PA1. Thus, the contact hole CH may expose a part of the drain electrode DE, and simultaneously may overlap a part of the drain electrode DE. A part of the drain electrode DE and a part of components on the protective layer IL may be physically or electrically interconnected through a conductive material provided in the contact hole CH. In this case, the conductive material provided in the contact hole CH may be a part of a pixel electrode PE, which will be described later.

A common electrode CE may be disposed on the protective layer IL. As shown in FIG. 3, the common electrode CE may have a plane shape on the protective layer IL in a region except for a part in which the contact hole CH is defined and a part neighboring the part in which the contact hole CH is defined. In an exemplary embodiment, the common electrode CE may include a transparent conductive material such as ITO, IZO, indium tin zinc oxide ("ITZO"), and Al-doped zinc oxide ("AZO").

A common signal may be applied to the common electrode CE such that the common electrode cooperates with the pixel electrode PE so as to generate an electric field. In this case, the common signal may be maintained to have a constant voltage value.

A second passivation layer PA2 may be disposed on the common electrode CE. In an exemplary embodiment, the second passivation layer PA2 may include an inorganic insulation material. The second passivation layer PA2 may serve to insulate between the common electrode CE disposed below and the pixel electrode PE disposed above. Thus, an electric field may be generated between the common electrode CE and the pixel electrode PE.

The pixel electrode PE may be disposed on the second passivation layer PA2. The pixel electrode PE may have a part physically connected to the drain electrode DE through the contact hole CH so as to receive a voltage from the drain electrode DE. In an exemplary embodiment, the pixel electrode PE may include a transparent conductive material such as ITO, IZO, ITZO, and AZO.

Unlike the common electrode CE which is provided all over a plurality of pixels, the pixel electrode PE may be separately provided in each pixel as shown in FIG. 4. Thus, unlike the common electrode CE which receives one common voltage throughout the plurality of pixels, the pixel electrode PE may receive different voltages in the respective pixels.

The pixel electrode PE may include branched finger electrodes BRs, and connection electrodes CNEs interconnecting the branched finger electrodes BRs. The branched finger electrodes BRs may be spaced apart from each other and parallel to each other. A slit SL which is an opening with no transparent conductive material provided therein may be defined between the branched finger electrodes BRs. Since the branched finger electrodes BRs are spaced apart from each other and parallel to each other, slits SLs may also be spaced apart from each other and parallel to each other.

The branched finger electrodes BRs, slits SLs, and the common electrode CE disposed beneath the branched finger electrodes BRs and the slits SLs may interact with each other so as to generate an electric field having a specific directivity. Furthermore, liquid crystal molecules LCs of the liquid crystal layer LCL may be controlled by thus-generated electric field.

The directivity of the electric field may be provided along the direction extending on a plane of the branched finger electrodes BRs. That is, the directivity of the electric field and the alignment direction of the liquid crystal molecules LCs may be determined according to the direction in which the branched finger electrodes BRs extend. In this case, the alignment direction of the liquid crystal molecules LCs may be a direction indicated by the major axis of the liquid crystal molecules LCs finally aligned by the electric field having the directivity.

The alignment direction of the liquid crystal molecules LCs may refer to the direction indicated by the major axis of the liquid crystal molecules LCs on a predetermined plane including both a predetermined straight line in which the liquid crystal molecules LCs extend in the first direction D1 and a predetermined straight line in which the liquid crystal molecules LCs extend in the second direction D2. The direction indicated by the major axis of the liquid crystal molecules LCs may be determined by the intensity of the electric field.

An average alignment direction of the liquid crystal molecules LCs may be defined as an average of directions indicated by the liquid crystal molecules LCs overlapping a region in which the branched finger electrodes BRs extending in the same direction, and slits SLs between the branched finger electrodes BRs are disposed.

In this case, domains of a region may be determined according to the average alignment direction of the liquid crystal molecules LCs. That is, regions having different average alignment directions of the liquid crystal molecules LCs may have different domains, and regions having the same or similar average alignment direction of the liquid crystal molecules LCs may have the same domain.

In an exemplary embodiment, the regions having similar average alignment direction of the liquid crystal molecules LCs may be those in which an angle between predetermined straight lines extending along an average alignment direction of the liquid crystal molecules LCs disposed in predetermined two regions is equal to or less than about 20°, for example.

More specifically, as shown in the drawings, each of the regions in which the respective pixel electrodes PEs are disposed may include a first domain DM1 and a second domain DM2. The branched finger electrodes BRs disposed in the first domain DM1 may be inclined to define a first angle θ1 between the branched finger electrodes BRs and a predetermined straight line extending in the first direction D1, and the branched finger electrodes BRs disposed in the second domain DM2 may be inclined to define a second angle θ2 between the branched finger electrodes BRs and a predetermined straight line extending in the first direction D1.

Since the branched finger electrodes BRs in the first domain DM1 and the second domain DM2 are inclined in different directions, average alignment directions of the liquid crystal molecules LCs in the first domain DM1 and the second domain DM2 may be different from each other.

Consequently, when the average alignment directions of the liquid crystal molecules LCs in the first domain DM1 and the second domain DM2 are different from each other, the liquid crystal molecules LCs may be viewed as various shapes even when an LCD device is viewed in a specific direction, thereby improving side visibility and viewing angle of the LCD device.

Although not shown in the drawings, average alignment directions of the liquid crystal molecules LCs may be similar to each other even when the branched finger electrodes BRs are inclined in different directions but the difference between the directions of inclination is not large, and the same domain may be provided in this case. In an exemplary embodiment, when a slit SL which defines a first similar angle similar to the first angle θ1 relative to a predetermined straight line extending in the first direction D1 is additionally defined, both the slit SL which defines the first angle θ1 relative to the straight line extending in the first direction D1, and the slit SL which defines the first similar angle may be defined in the first domain DM1. The term "similar angles" as used herein may refer to angles being compared with each other in which a difference of about −20° to about 20° exists. The same may be applied to the slits SLs defined in the second domain DM2.

However, the liquid crystal molecules LCs disposed at a boundary between the first domain DM1 and the second domain DM2 may be influenced by both of the first domain DM1 and by the second domain DM2, and thus the liquid crystal molecules LCs may not be constantly controlled in any one direction. Resultantly, light may not be transmitted as desired, and thus a texture viewed as a dark area may be generated.

When the first domain DM1 and the second domain DM2 are adjacent to each other along the second direction D2 like the exemplary embodiment, the boundary between the first domain DM1 and the second domain DM2 may be disposed along the first direction D1. In this case, a first gate line GL1 may overlap the boundary between the first domain DM1 and the second domain DM2 of first to sixth pixel electrodes PE_1 to PE_6. Furthermore, a third gate line GL3 may overlap the boundary between the first domain DM1 and the second domain DM2 of seventh to twelfth pixel electrodes PE_7 to PE_12. As described above, first to fourth gate lines GL1 to GL4 and first to fourth data lines DL1 to DL4 may include a metallic material which does not transmit light, and thus may degrade transmittance of an LCD device. However, since both the boundary between the first domain DM1 and the second domain DM2 in which light is not transmitted as desired and thus a texture viewed as a dark area may be generated, and the first and third gate lines GL1 and GL3 may extend in the first direction D1, the first and third gate lines GL1 and GL3 may overlap the boundary between the first domain DM1 and the second domain DM2, thereby minimizing degradation of transmittance of the LCD device.

Although, in the exemplary embodiment, the pixel electrode PE is described as being disposed on the common electrode CE, the invention is not limited thereto, and the common electrode CE may be disposed on the pixel electrode PE. The structure in which the common electrode CE is disposed on the pixel electrode PE will be described later with reference to FIGS. 10 to 13.

Second, fourth and sixth transistors TR2, TR4 and TR6 connected to the first gate line GL1 may be disposed at one side of the first gate line GL1 in the second direction D2. That is, as shown in FIG. 1, the second, the fourth and the sixth transistors TR2, TR4 and TR6 may be disposed beneath the first gate line GL1. This arrangement may enable an LCD device to have improved display quality.

Specifically, the second, the fourth and the sixth transistors TR2, TR4 and TR6 connected to the first gate line GL1 overlapping the boundary between the first domain DM1 and the second domain DM2 may not overlap second, fourth and sixth pixel electrodes PE2, PE4 and PE6. Therefore, the second, the fourth and the sixth pixel electrodes PE2, PE4 and PE6 may have a shape in which a part thereof is recessed, and since regions in which the second, the fourth and sixth transistors TR2, TR4 and TR6 are disposed may be shielded by a light blocking member BM, which will be described later, the regions may not allow light to transmit therethrough.

In this case, when the second, the fourth and sixth transistors TR2, TR4 and TR6 are not disposed uniformly in any one direction relative to the first gate line GL1, regions which do not allow light to transmit by the transistors in the second, the fourth and the sixth pixel electrodes PE2, PE4 and PE6 may be irregularly arranged, thus degrading display quality. Therefore, the second, the fourth and the sixth transistors TR2, TR4 and TR6 may be uniformly disposed at one side from the first gate line GL1 in the second direction D2, thereby improving display quality of the LCD device.

The opposing substrate OAS will now be described.

The opposing substrate OAS may include a second base substrate SUB2, a light blocking member BM, a color filter CF, and an overcoat layer OC.

The blocking member BM may be disposed on the second base substrate SUB2 (beneath the second base substrate SUB2 in the drawings). The blocking member BM may overlap the transistor TR, the data line, and the gate line of each pixel, thereby preventing light leakage caused by a misalignment of liquid crystal molecules LCs.

However, the light blocking member BM may not be disposed in a region in which the gate line overlaps the boundary between the first domain DM1 and the second domain DM2 of each pixel electrode PE. The color filter CF may be disposed on the second base substrate SUB2 and the light blocking member BM. The color filter CF may enable light of a specific wavelength band incident from an outside of the first base substrate SUB1 to pass, and block light of other wavelength bands, thus enabling light emitted to an outside of the second base substrate SUB2 to have a specific color.

In an exemplary embodiment, a red color filter which enables light to be viewed in a red color may enable light of about 580 nanometers (nm) to about 780 nm wavelength band to pass, and absorb (and/or reflect) light of other wavelength bands, for example. In an exemplary embodiment, a green color filter which enables light to be viewed in a green color may enable light of about 450 nm to about 650 nm wavelength band to pass, and absorb light of other wavelength bands, for example. In an exemplary embodiment, a blue color filter which enables light to be viewed in a blue color may enable light of about 380 nm to about 560 nm wavelength band to pass, and absorb light of other wavelength bands, for example. In an exemplary embodiment, the red color filter may include a pigment or a photosensitive organic material representing a red color, the green color filter may include a pigment or a photosensitive organic material representing a green color, and a blue color filter may include a pigment or a photosensitive organic material representing a blue color, for example.

However, the invention is not limited thereto, and the blocking member BM and the color filter CF described above may not necessarily be adjacent to the second base substrate SUB2, and may be disposed on the first base substrate SUB1. In this case, the color filter CF may be disposed to replace the protective layer IL. In an alternative exemplary embodiment, the color filter CF may be interposed between the first passivation layer PA1 and the protective layer IL, and in this case, the protective layer IL may serve to planarize steps caused by the color filter CF.

The overcoat layer OC may be disposed on the light blocking member BM and the color filter CF. The overcoat layer OC may reduce steps caused by the light blocking member and the color filter CF. However, the invention is not limited thereto, and the overcoat layer OC may be omitted.

The liquid crystal layer LCL will now be described.

The liquid crystal layer LCL may include a plurality of liquid crystal molecules LCs having dielectric anisotropy. The liquid crystal molecules LCs may be vertically aligned liquid crystal molecules interposed between the array substrate AS and the opposing substrate OAS in the direction horizontal to the two substrates AS and OAS. The liquid crystal molecules may rotate in a predetermined direction between the array substrate AS and the opposing substrate OAS when an electric field is applied between the array substrate AS and the opposing substrate OAS, thereby transmitting or blocking light.

The liquid crystal layer LCL may further include a lower alignment layer RM1 and an upper alignment layer RM2 so as to pretilt the liquid crystal molecules LCs. The lower alignment layer RM1 may be disposed on the pixel electrode PE, and the upper alignment layer RM2 may be disposed beneath the overcoat layer OC. The lower alignment layer RM1 and the upper alignment layer RM2 may enable the liquid crystal molecules LCs to be aligned in a predetermined direction when the electric field is not applied to the liquid crystal molecules LCs. In an exemplary embodiment, the liquid crystal molecules LCs may be aligned such that the major axis thereof indicates the direction which defines an angle of about 0.5° to about 3° in the direction perpendicular to a plane on which the lower alignment layer RM1 is disposed from a predetermined straight line extending in one direction on the plane on which the lower alignment layer RM1 is disposed.

However, in an exemplary embodiment, a part or the whole of the lower alignment layer RM1 and the upper alignment layer RM2 may be omitted. In this case, an electrical or chemical treatment may be performed on the liquid crystal layer LCL so as to pretilt the liquid crystal molecules LCs, or the liquid crystal molecules LCs itself may include a specific material so as to pretilt the liquid crystal molecules LCs.

As shown in FIG. 1, two pixels adjacent to each other along the first direction D1 may be connected to one data line. In this case, the number of gate lines desired for controlling the two pixels may be two.

The term "pixel" as used herein may mean a component on a region in which liquid crystal molecules LCs controlled at the same timing by the same gate signal and the same data signal are disposed, and a transistor TR for controlling the component.

In general, since a data driving chip for providing the data signal to the data line is more expensive than a gate driving chip for providing the gate signal to the gate line, cost reduction may be achieved when the number of data lines (e.g., DL1 to DL4) desired correspondingly to the increased number of gate lines is decreased even when the number of desired gate lines increases. In addition, when the gate driving chip is disposed directly on the array substrate AS, an increase in cost caused by the increased number of gate lines may hardly occur, and thus an effect of cost reduction resulting from the reduced number of data lines may be maximized.

In this context, the LCD device of an exemplary embodiment of the invention uses one data line and two gate lines to control two pixels adjacent to each other in the first direction D1, thereby reducing the number of data lines.

More specifically, a second pixel PX_2 may be connected to the second data line DL2 and the first gate line GL1, and a third pixel PX_3 may be connected to the second data line DL2 and the second gate line GL2. That is, the second pixel PX_2 and the third pixel PX_3 may be connected to the same data line, that is, the second data line DL2, but may be connected to the first and second gate lines GL1 and GL2 which are different from each other.

Furthermore, a fourth pixel PX_4 may be connected to the third data line DL3 and the first gate line GL1, and a fifth pixel PX_5 may be connected to the third data line DL3 and the second gate line GL2.

The first pixel PX_1 shown in FIG. 1 may be connected to the first data line DL1 which is the same data line as that of another pixel (not shown) adjacent to the left side of the first pixel PX_1, and a sixth pixel PX_6 may be connected to the fourth data line DL4 which is the same data line as that of another pixel (not shown) adjacent to the right side of the sixth pixel PX_6.

A plurality of pixels may be provided in an LCD device by using, as a basic unit, the connection relation of the first to sixth pixels PX_1 to PX_6. In an exemplary embodiment, as shown in FIG. 1, seventh to twelfth pixels PX_7 to PX_12 may have a structure same as that of the first to sixth pixels PX_1 to PX_6, for example.

The second pixel PX_2, the fourth pixel PX_4, and the sixth pixel PX_6 connected to the first gate line GL1 may include respective gate electrodes GEs. In this case, the gate electrode GE of the second pixel PX_2, the gate electrode GE of the fourth pixel PX_4, and the gate electrode of the sixth pixel PX_6 may protrude in the same direction. That is, as shown in the drawings, all of the gate electrode GE of the second pixel PX_2, the gate electrode GE of the fourth pixel PX_4, and the gate electrode of the sixth pixel PX_6 may protrude in the second direction D2. Thus, transistors TRs of all of the pixels PX_2, PX_4 and PX_6 connected to the first gate line GL1 may be disposed toward the same direction from the first gate line GL1, and regions of transmission loss caused by the transistor TR of each pixel may be uniformly arranged, thereby minimizing degradation of display quality.

When the two pixels adjacent to each other in the first direction D1 are connected to one data line and different gate lines, the gate lines may partially overlap the boundary between the first domain DM1 and the second domain DM2, thereby improving transmission. This will be described in detail with reference to FIG. 5.

Figure 5:
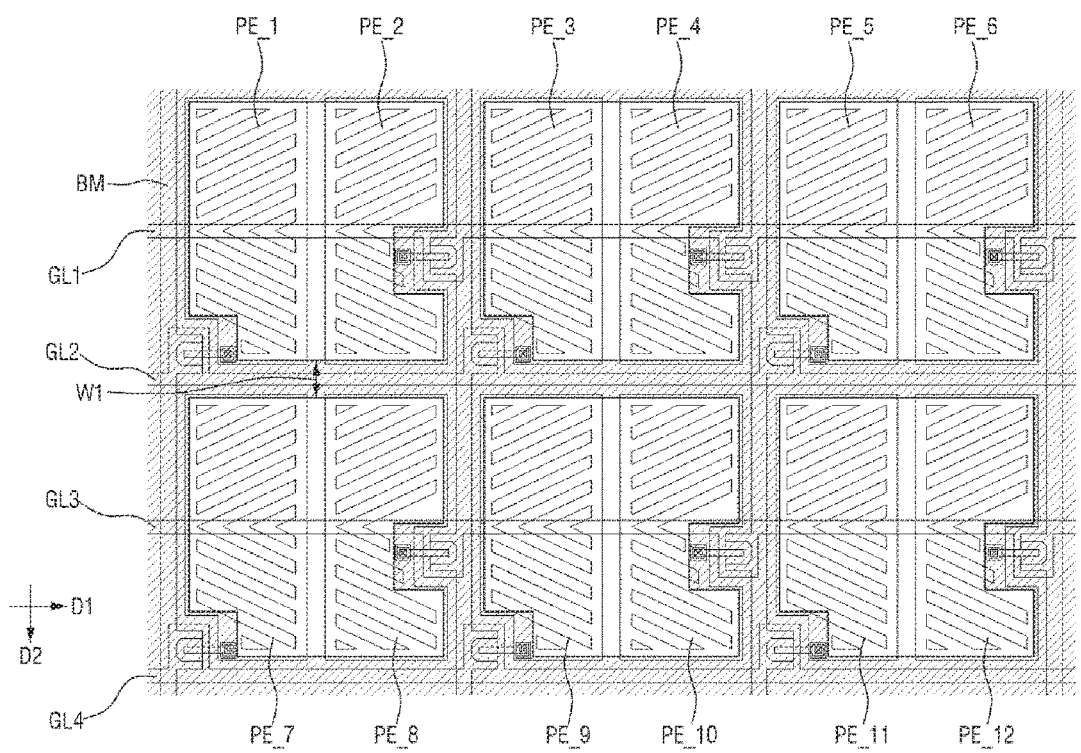
FIG. 5 is a plan view illustrating the part of the pixels shown in FIG. 1 to which a light blocking member is added.

FIG. 5 is a plan view illustrating the part of the pixels shown in FIG. 1 to which a light blocking member is added.

Referring to FIG. 5, the first and second gate lines GL1 and GL2 may drive the first to sixth pixels PX_1 to PX_6 (refer to FIG. 1) disposed in a first column and the seventh to twelfth pixels PX_7 to PX_12 (refer to FIG. 1) disposed in a second column. However, the first gate line GL1 may overlap the first to sixth pixels PX_1 to PX_6 such that only the second gate line GL2 may be interposed between the first to sixth pixels PX_1 to PX_6 disposed in the first column and the seventh to twelfth pixels PX_7 to PX_12 disposed in the second column.

In this case, the light blocking member BM interposed between the first to sixth pixels PX_1 to PX_6 disposed in the first column and the seventh to twelfth pixels PX_7 to PX_12 disposed in the second column may have a thickness in the second direction corresponding to a first length W1. That is, since the first gate line GL1 overlaps the first to sixth pixels PX_1 to PX_6, the first length W1 may be minimized and thus the area occupied by the light blocking member BM in the LCD device may be minimized, thereby improving transmittance of the LCD device. In an exemplary embodiment, a length W1 of the light blocking member BM in the second direction D2 may be equal to or less than 11 micrometers, for example.

Figure 6:
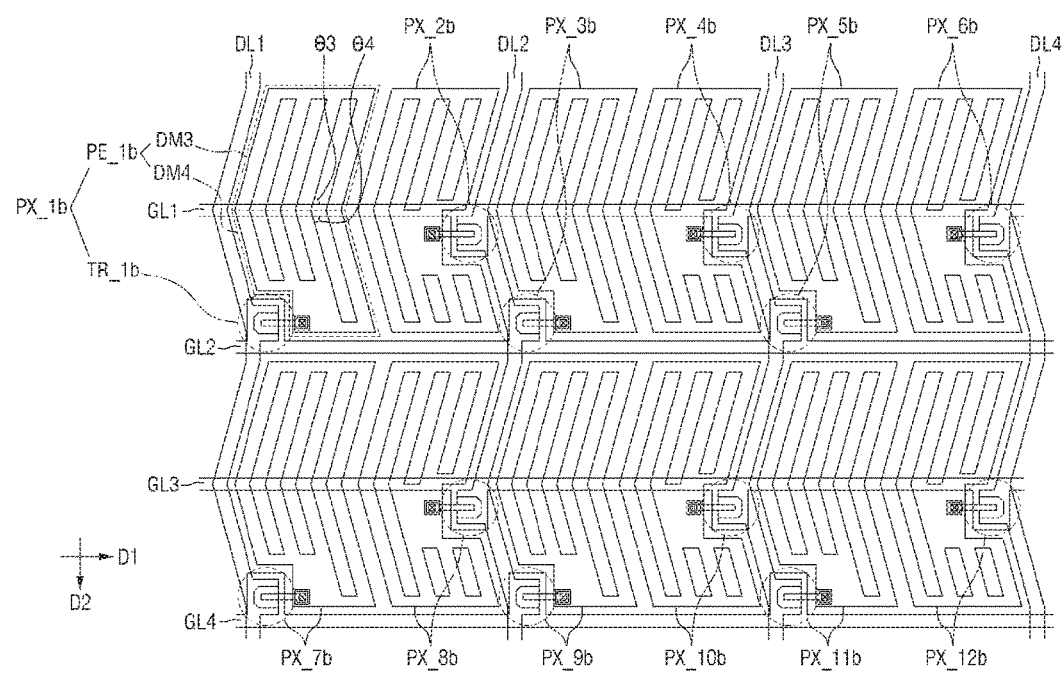
FIG. 6 is a plan view of another exemplary embodiment of a part of pixels of an LCD device according to the invention.

FIG. 6 is a plan view of a part of pixels of an LCD device according to another exemplary embodiment of the invention.

Referring to FIG. 6, in the LCD device according to the exemplary embodiment, a pixel electrode PE of each pixel may have two domains DM3 and DM4 like those of the exemplary embodiment shown in FIG. 1. That is, in the illustrated exemplary embodiment, a plurality of slits SLs corresponding to an opening may be defined in the pixel electrode PE of each of first to twelfth pixels PX_1b to PX_12b. A part of the slits SLs may be inclined to define a third angle θ3 relative to the gate line or a straight line extending in the first direction D1, and the remaining part of the slits SLs may be inclined to define a fourth angle θ4 relative to the gate line or a predetermined straight line extending in the first direction D1.

In this case, the first to twelfth pixels PX_1b to PX_12b may include the third domain DM3 corresponding to a region in which branched finger electrodes BRs are inclined to define the third angle θ3 relative to a predetermined straight line extending in the first direction D1, and the fourth domain DM4 corresponding to a region in which branched finger electrodes BRs are inclined to define the fourth angle θ4 relative to a predetermined straight line extending in the first direction D1. Liquid crystal molecules LCs may have different average alignment directions in the third domain DM3 and the fourth domain DM4.

As shown in the drawings, when the average alignment directions of liquid crystal molecules LCs are different from each other in the third domain DM3 and the fourth domain DM4, the liquid crystal molecules LCs may be viewed in various shapes even when an LCD device is viewed in a specific direction, thus improving side visibility and viewing angle of the LCD device. However, in the exemplary embodiment, unlike those of the exemplary embodiment described with reference to FIG. 1, the third angle θ3 and the fourth angle θ4 may be larger than about 45° and equal to or smaller than about 90°, for example. In this case, when the width of the pixel electrode PE extended in the second direction D2 is wider than the width of the pixel electrode PE extended in the first direction D1 as shown in the drawings, the third domain DM3 and the fourth domain DM4 may have respective outlines provided to be parallel to each slit SL so as to enable slits SLs to have a maximally uniform shape and thus to improve transmittance. That is, the pixel electrode PE may have a shape with inclined left and right sides rather than a rectangle.

Accordingly, the data line adjacent to the pixel electrode PE may also be inclined in parallel to the outline of the pixel electrode PE, minimizing degradation of transmittance.

Although the pixel electrode PE has a shape with inclined left and right sides, a texture may be generated in the boundary between the third domain DM3 and the fourth domain DM4. Therefore, the first gate line GL1, the third gate line GL3 or the like may overlap the boundary between the third domain DM3 and the fourth domain DM4, and thus degradation of transmittance caused by gate lines may be minimized.

A transistor (e.g., TR_1b) of the pixels (e.g., PX_1b to PX_12b) may be substantially similar to the transistors TR of the exemplary embodiment of FIGS. 1 to 5, and thereby a detailed description will be omitted.

Figure 7:
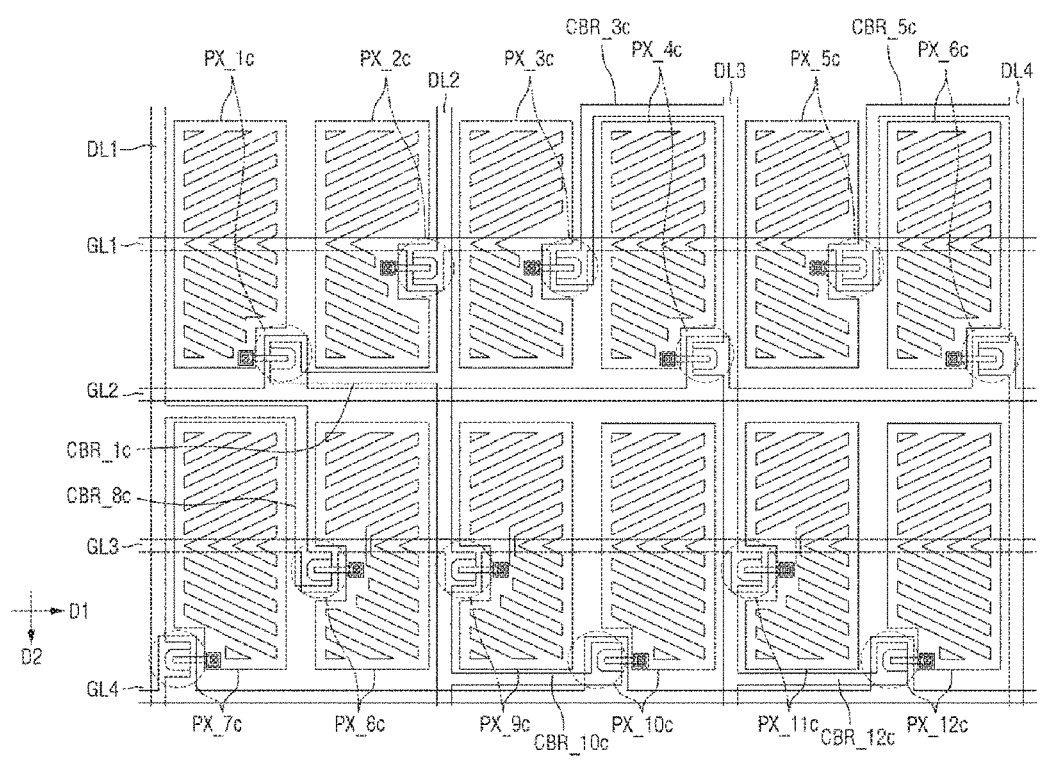
FIG. 7 is a plan view of another exemplary embodiment of a part of pixels of an LCD device according to the invention.

FIG. 7 is a plan view of a part of pixels of an LCD device according to another exemplary embodiment of the invention.

Hereinafter, identical reference numerals are used to identify identical components of the foregoing exemplary embodiment described above, and duplicate description will be omitted or made brief.

Referring to FIG. 7, a part of the first to sixth pixels PX_1c to PX_6c may be connected to the data line which is not adjacent to the pixels.

Specifically, the first pixel PX_1c may be connected to the second data line DL2 and the second gate line GL2. In this case, since the second pixel PX_2c may be interposed between the first pixel PX_1c and the second data line DL2 such that the first pixel PX_1c and the second data line DL2 may be spaced apart from each other, a first connection wire CBR_1c may be branched from the second data line DL2 and connected to the first pixel PX_1c. Although the first connection wire CBR_1c is depicted as being extended in the first direction D1, the invention is not limited thereto, and the first connection wire CBR_1c may extend in both the first direction D1 and the second direction D2 so as to connect a corresponding pixel and a data line connected thereto when a transistor TR of the corresponding pixel is disposed at a center of the pixel electrode rather than an end thereof.

The second pixel PX_2c may be connected to the second data line DL2 and the first gate line GL1. Since the second pixel PX_2c and the second data line DL2 are adjacent to each other, no connection wire may be provided therebetween.

The third pixel PX_3c may be connected to the third data line DL3 and the first gate line GL1. Since the fourth pixel PX_4c may be interposed between the third pixel PX_3c and the third data line DL3 such that the third pixel PX_3c and the third data line DL3 may be spaced apart from each other, a third connection wire CBR_3c may be branched from the third data line DL3 and connected to the third pixel PX_3c. The third connection wire CBR_3c may extend in both the first direction D1 and the second direction D2.

The fourth pixel PX_4c may be connected to the third data line DL3 and the second gate line GL2. Since the fourth pixel PX_4c and the third data line DL3 are adjacent to each other, no connection wire may be provided therebetween.

The fifth pixel PX_5c may be connected to the fourth data line DL4 and the first gate line GL1. Since the sixth pixel PX_6c may be interposed between the fifth pixel PX_5c and the fourth data line DL4 such that the fifth pixel PX_5c and the fourth data line DL4 may be spaced apart from each other, a fifth connection wire CBR_5c may be branched from the fourth data line DL4 and connected to the fifth pixel PX_5c. The fifth connection wire CBR_5c may extend in both the first direction D1 and the second direction D2.

The sixth pixel PX_6c may be connected to the fourth data line DL4 and the second gate line GL2. Since the sixth pixel PX_6c and the fourth data line DL4 are adjacent to each other, no connection wire may be provided therebetween.

The seventh pixel PX_7c may be connected to the first data line DL1 and the fourth gate line GL4. Since the seventh pixel PX_7c and the first data line DL1 are adjacent to each other, no connection wire may be provided therebetween.

The eighth pixel PX_8c may be connected to the first data line DL1 and the third gate line GL3. Since the seventh pixel PX_7c may be interposed between the eighth pixel PX_8c and the first data line DL1 such that the eighth pixel PX_8c and the first data line DL1 may be spaced apart from each other, an eighth connection wire CBR_8c may be branched from the first data line DL1 and connected to the eighth pixel PX_8c. The eighth connection wire CBR_8c may extend in both the first direction D1 and the second direction D2.

The ninth pixel PX_9c may be connected to the second data line DL2 and the third gate line GL3. Since the ninth pixel PX_9c and the second data line DL2 are adjacent to each other, no connection wire may be provided therebetween.

The tenth pixel PX_10c may be connected to the second data line DL2 and the fourth gate line GL4. Since the ninth pixel PX_9c may be interposed between the tenth pixel PX_10c and the second data line DL2 such that the tenth pixel PX_10c and the second data line DL2 may be spaced apart from each other, a tenth connection wire CBR_10c may be branched from the second data line DL2 and connected to the tenth pixel PX_10c. The tenth connection wire CBR_10c may extend in the first direction D1.

The eleventh pixel PX_11c may be connected to the third data line DL3 and the third gate line GL3. Since the eleventh pixel PX_11c and the third data line DL3 are adjacent to each other, no connection wire may be provided therebetween.

The twelfth pixel PX_12c may be connected to the third data line DL3 and the fourth gate line GL4. Since the eleventh pixel PX_11c may be interposed between the twelfth pixel PX_12c and the third data line DL3 such that the twelfth pixel PX_12c and the third data line DL3 may be spaced apart from each other, a twelfth connection wire CBR_12c may be branched from the third data line DL3 and connected to the twelfth pixel PX_12c. The twelfth connection wire CBR_12c may extend in the first direction D1.

When pixels and data line are connected respectively by using connection wires as described above, signals input to the data lines may perform column inversion, which may be viewed as dot inversion to the eyes of a user, taking advantages of both schemes.

That is, the signals may perform column inversion in which adjacent data lines receive data signals having different polarities, which may be actually viewed to the eyes of a user as dot inversion in which dots adjacent in vertical and horizontal directions, based on predetermined dot units of an LCD device, have polarities different from each other. In general, column inversion is relatively less expensive to implement and dot inversion is relatively excellent in display quality, and the exemplary embodiment may take merits of both column inversion and dot inversion.

Specifically, in one frame, a data signal of positive polarity may be provided to the first and third data lines DL1 and DL3 and a data signal of negative polarity may be provided to the second and fourth data lines DL2 and DL4.

The positive polarity as used herein may be relative and may mean that the voltage value of the data signal being input is relatively higher than the voltage value of the common signal. The negative polarity as used herein may mean that the voltage value of the data signal being input is relatively lower than the voltage value of the common signal.

When gate signals are sequentially provided to the first to fourth gate lines GL1 to GL4, data signals of positive polarity may be provided to the first pixel PX_1c, the second pixel PX_2c, the fifth pixel PX_5c, the sixth pixel PX_6c, the ninth pixel PX_9c, and the tenth pixel PX_10c, and data signals of negative polarity may be provided to the third pixel PX_3c, the fourth pixel PX_4c, the seventh pixel PX_7c, the eighth pixel PX_8c, the eleventh pixel PX_11c, and the twelfth pixel PX_12c. That is, dots adjacent in vertical and horizontal directions may be provided with data signals having different polarities, based on a dot unit of two adjacent pixels in the first direction D1, and thus the user may recognize dot inversion (which actually is column inversion) as being performed in the LCD device. This may lead to reduced cost while maximizing improvement in display quality.

Figure 8:
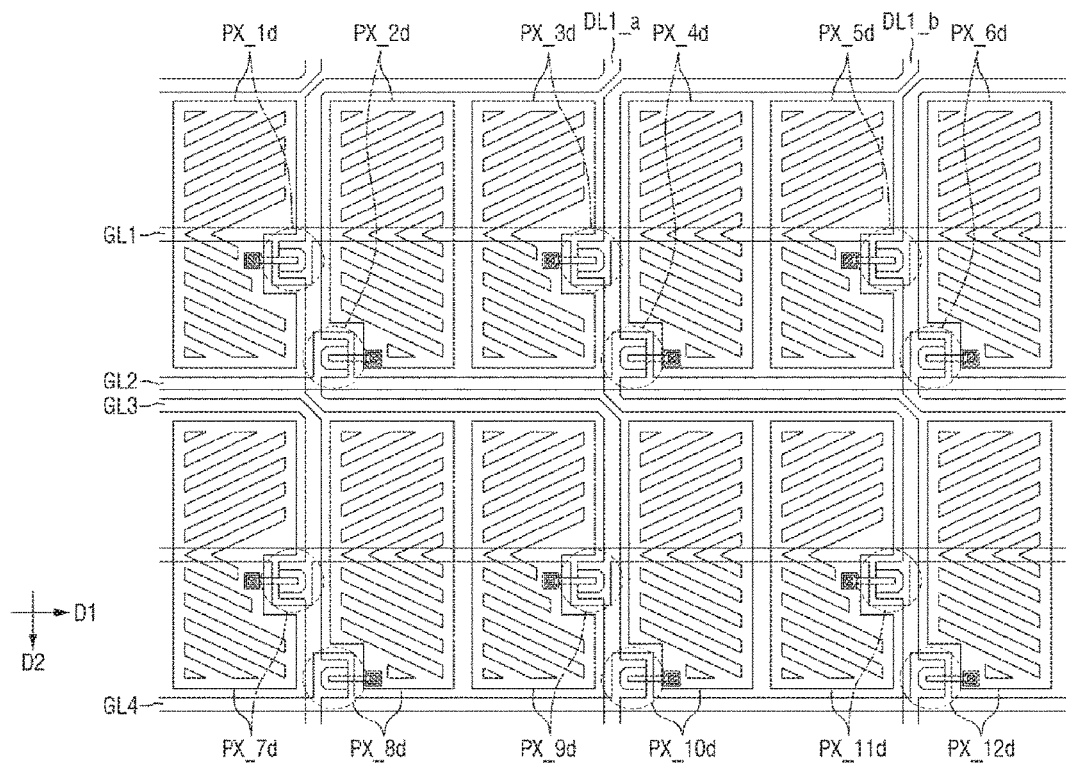
FIG. 8 is a plan view of another exemplary embodiment of a part of pixels of an LCD device according to the invention.

FIG. 8 is a plan view of a part of pixels of an LCD device according to another exemplary embodiment of the invention.

Hereinafter, identical reference numerals are used to identify identical components of the exemplary embodiments described above, and duplicate description will be omitted or made brief.

Referring to FIG. 8, each of data lines DL1_a and DL1_b may extend not only in the second direction D2 but also in the first direction D1. Thus, one data line may be connected to each of different pixels which are not adjacent to each other in the second direction D2.

In an exemplary embodiment, the first data line DL1_a may be connected to a first pixel PX_1d and a second pixel PX_2d, and to a ninth pixel PX_9d and a tenth pixel PX_10d, not adjacent to both the first pixel PX_1d and the second pixel PX_2d, for example.

Furthermore, the second data line DL1_b may be connected to a third pixel PX_3d and a fourth pixel PX_4d, and to an eleventh pixel PX_11d and a twelfth pixel PX_12d, not adjacent to both the third pixel PX_3d and the fourth pixel PX_4d.

Although, in the illustrated exemplary embodiment, a distance in which each data line extends in the second direction D2 is illustrated as being corresponded to two pixels, the invention is not limited thereto, and each data line may extend in the second direction D2 as much as a distance shorter than the distance corresponding to two pixels, or extend in the second direction D2 as much as a distance longer than the distance corresponding to two pixels.

This structure may enable an LCD device to be driven by further various methods.

Figure 9:
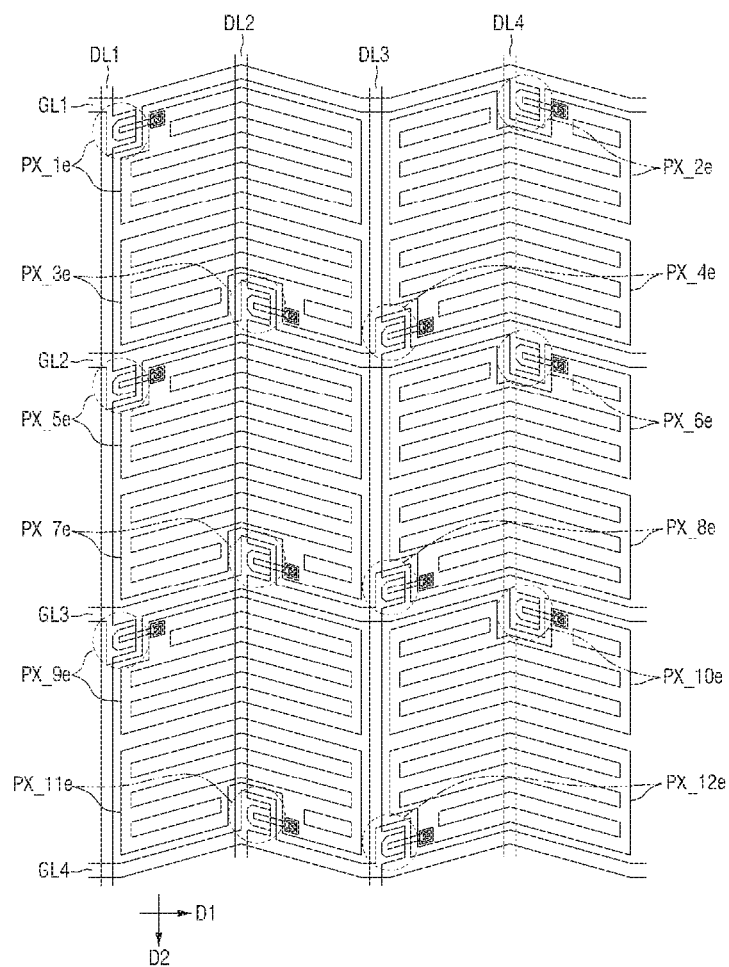
FIG. 9 is a plan view of another exemplary embodiment of a part of pixels of an LCD device according to the invention.

FIG. 9 is a plan view of a part of pixels of an LCD device according to another exemplary embodiment of the invention.

Hereinafter, identical reference numerals are used to identify identical components of the exemplary embodiments described above, and duplicate description will be omitted or made brief.

Referring to FIG. 9, unlike those of the exemplary embodiments described above, one gate line and four data lines are needed to drive two pixels adjacent in the first direction D1 among the plurality of pixels (e.g., PX_1e to PX_12e).

The exemplary embodiment is the same as the exemplary embodiments described above in that each pixel has two domains, but differs from the exemplary embodiments described above in that a boundary between two domains is defined along the second direction D2 rather than the first direction D1. In this case, since the gate line may extend in the first direction D1, the gate line may not overlap the boundary between two domains of each pixel electrode PE, but since the data line may extend in the second direction D2, the data line may overlap the boundary between two domains of each pixel electrode PE.

That is, as shown in the drawing, the second and fourth data lines DL2 and DL4 may overlap the boundary between two domains of each pixel electrode PE.

Thus, transmittance of an LCD device may be improved in proportion to the number of data lines overlapping the boundary between two domains of each pixel electrode PE.

Figure 10:
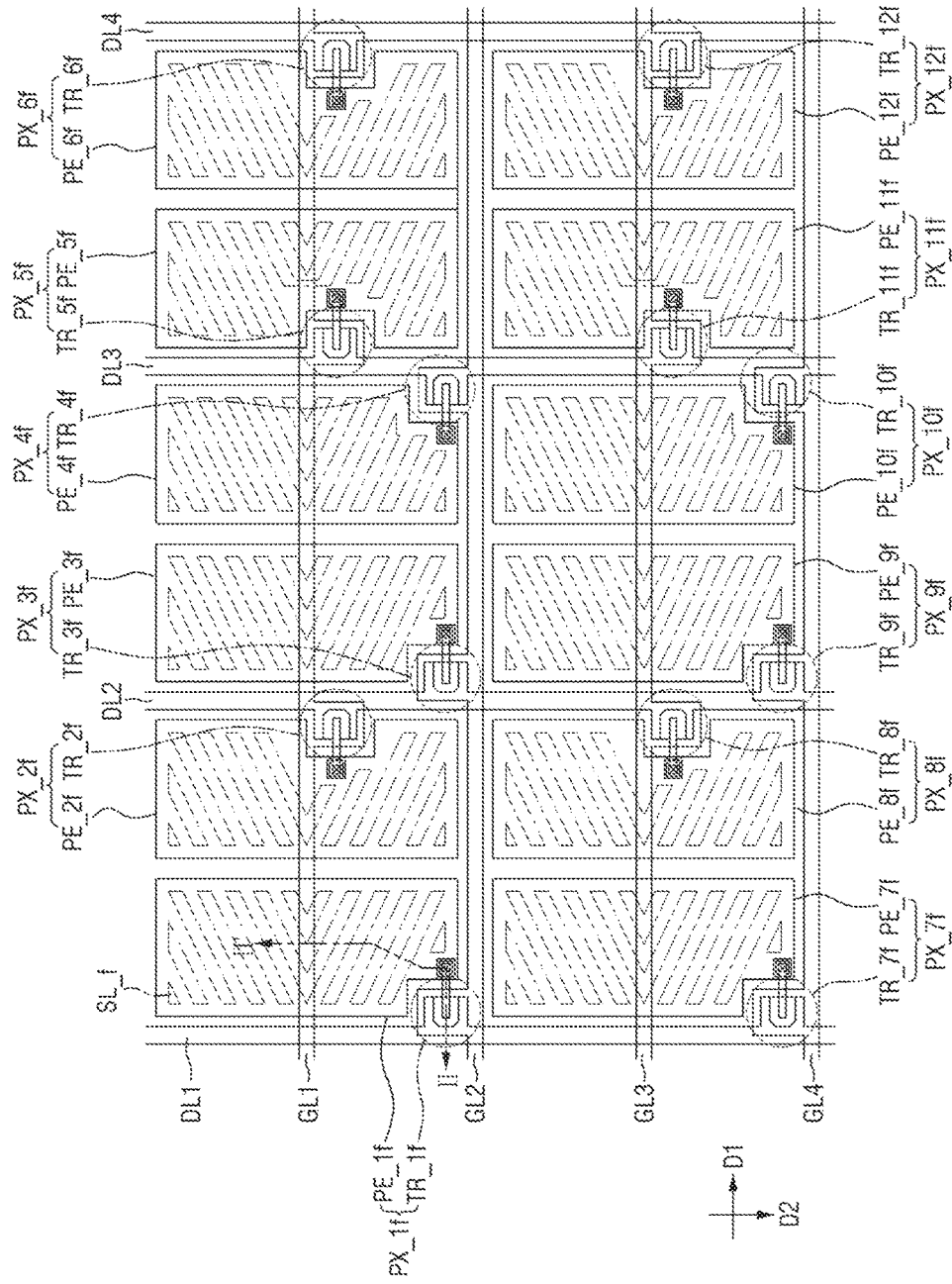
FIG. 10 is a plan view of another exemplary embodiment of a part of pixels of an LCD device according to the invention.
Figure 11:
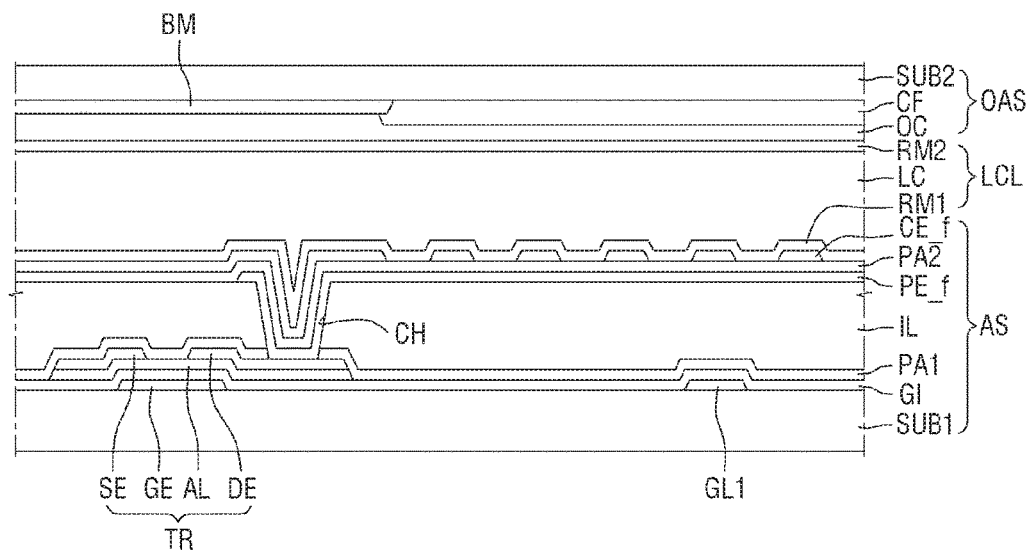
FIG. 11 is a cross-sectional view taken along line II-II' of FIG. 10.
Figure 12:
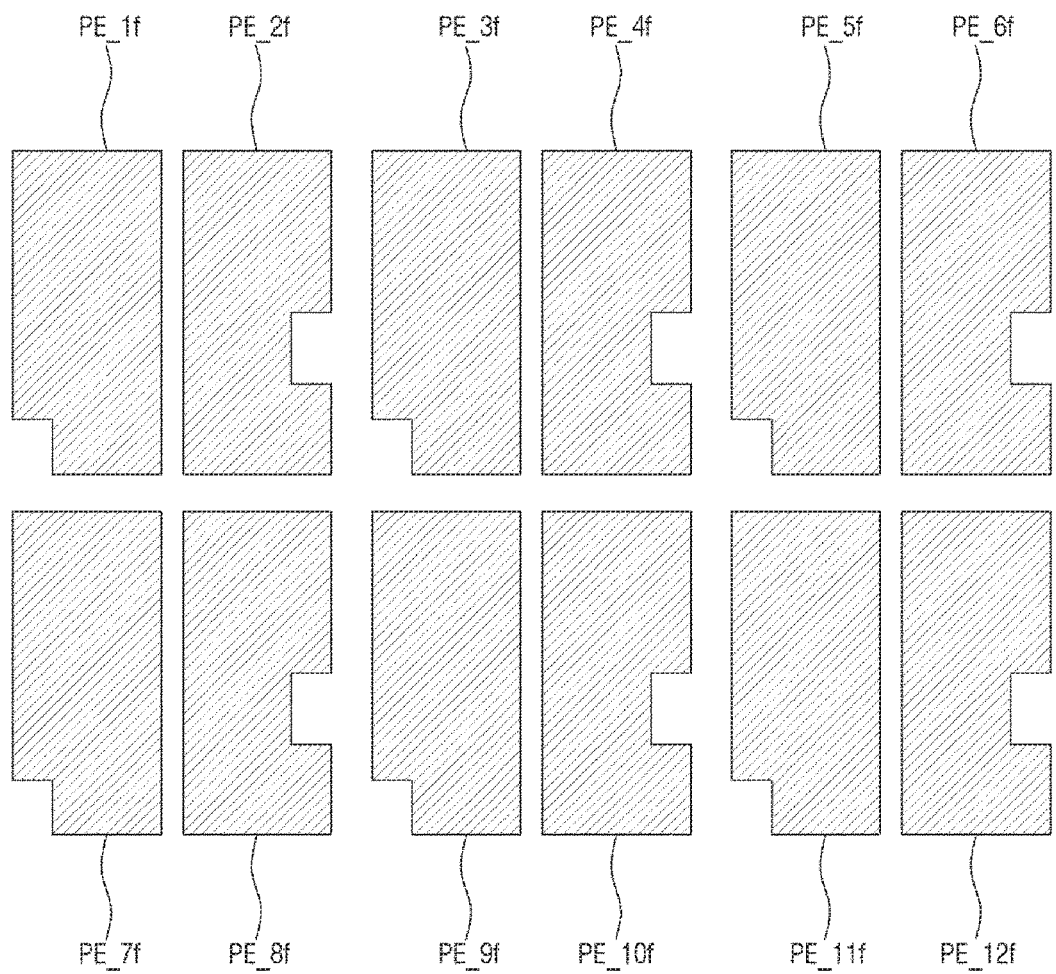
FIG. 12 is a plane view illustrating pixel electrodes of the part of pixels shown in FIG. 10.
Figure 13:
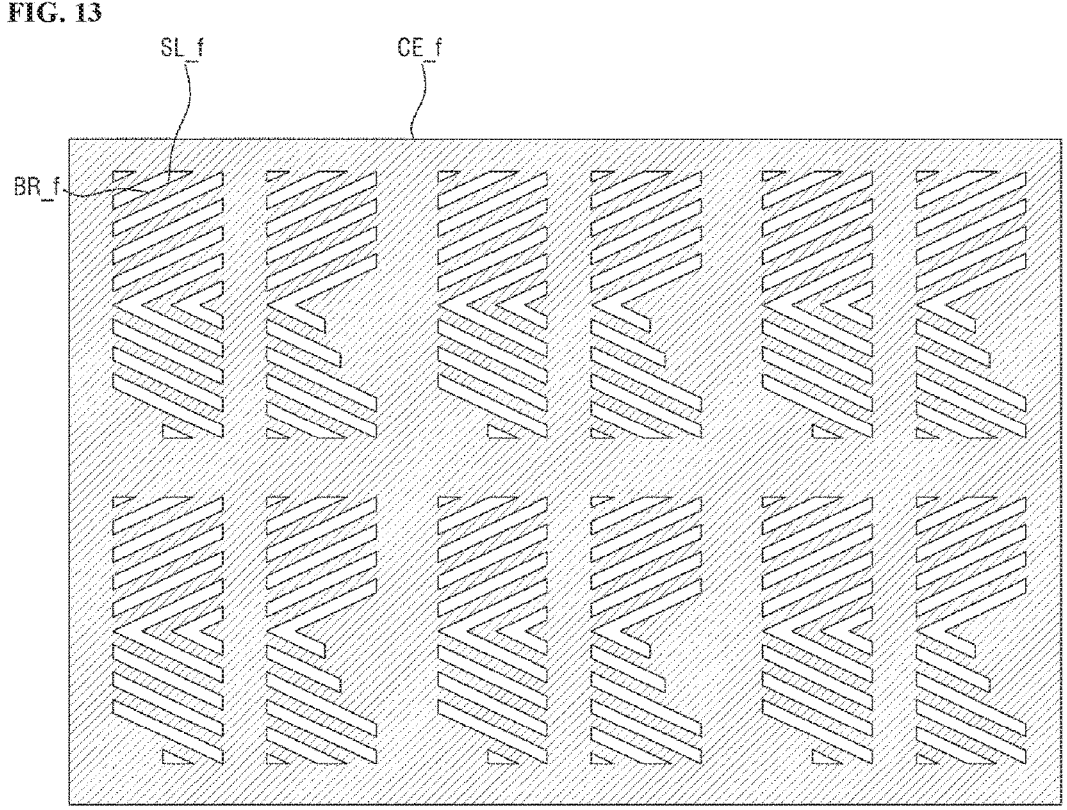
FIG. 13 is a plane view illustrating a common electrode of the part of the pixels shown in FIG. 10.

FIG. 10 is a plan view of a part of pixels of an LCD device according to another exemplary embodiment of the invention. FIG. 11 is a cross-sectional view taken along line II-II' of FIG. 10. FIG. 12 is a plane view illustrating pixel electrodes of the part of pixels shown in FIG. 10. FIG. 13 is a plane view illustrating a common electrode of the part of the pixels shown in FIG. 10.

Hereinafter, identical reference numerals are used to identify identical components of the exemplary embodiments described above, and duplicate description will be omitted or made brief.

Referring to FIGS. 10 to 13, the LCD device according to the exemplary embodiment differs from the LCD device according to the exemplary embodiment described with reference to FIG. 1 with respect to gate lines GL1 to GL4 to which some pixels PX_4f, PX_5f, PX_10f and PX_11f are connected. Furthermore, the LCD device according to the exemplary embodiment differs from the LCD device according to the exemplary embodiment described with reference to FIG. 1 with respect to the arrangement and structure of a pixel electrode PE_f and a common electrode CE_f.

Specifically, unlike the LCD device according to the exemplary embodiment described with reference to FIG. 1 in which the common electrode CE is disposed on the protective layer IL, the second passivation layer PA2 is disposed on the common electrode CE, and the pixel electrode PE is disposed on the second passivation layer PA2, the LCD device according to the exemplary embodiment is structured in that the pixel electrode PE_f is disposed on the protective layer IL, the second passivation layer PA2 is disposed on the pixel electrode PE_f, and the common electrode CE_f is disposed on the second passivation layer PA2.

Specifically, as shown in FIG. 12, the pixel electrode PE_f may be disposed individually in each of pixels. Therefore, the pixel electrode PE_f may receive different voltages in the respective pixels. However, unlike the exemplary embodiment described with reference to FIG. 1, the pixel electrode PE_f disposed in each pixel may have a plane shape with no opening.

As shown in FIG. 13, the common electrode CE_f may include a single unitary body on the protective layer IL except for a part in which a slit SL_f is defined. That is, unlike the exemplary embodiment described with reference to FIG. 1, the slit SL_f defined correspondingly to a region in which pixels are disposed may be defined in the common electrode CE_f. The slit SL_f may be an opening in which no transparent conductive material is provided.

Branched finger electrodes BR_f may be disposed between the slits SL_f. The branched finger electrodes BR_f may be spaced apart from each other and disposed in parallel to each other. However, unlike the exemplary embodiment described with reference to FIG. 1, the connection electrode CNE for interconnecting the branched finger electrodes BR_f may not be provided. However, the common electrode CE_f may be disposed all over the pixels, and thus a part of the common electrode CE_f which does not correspond to the branched finger electrodes BR_f may interconnect the branched finger electrodes BR_f.

The branched finger electrodes BR_f, the slits SL_f, and pixel electrodes PE_f disposed beneath the branched finger electrodes BR_f and the slits SL_f may interact with each other so as to generate an electric field having a specific directivity. Furthermore, liquid crystal molecules LCs of the liquid crystal layer LCL may be controlled by thus-generated electric field. The directivity of the electric field and the alignment direction of the liquid crystal molecules are same as those of the embodiment described with reference to FIG. 1, and thus a plurality of domains may be defined.

In this case, the pixel electrode PE_f may receive the data signal, and a voltage charging or being discharged from the pixel electrode PE_f may also vary in correspondence to a change in a voltage value of the data signal. On the contrary, a voltage value of the common signal in the common electrode CE_f may be maintained constant as described above.

When considering the cross sectional surface of an LCD device, that is, in view of the LCD device along the direction perpendicular to the first base substrate SUB1, unlike the LCD device according to the exemplary embodiment described with reference to FIG. 1 in which the common electrode CE is interposed between the pixel electrode PE and the first to fourth gate lines GL1 to GL4, the common electrode CE_f may not be interposed between the pixel electrode PE_f and the first to fourth gate lines GL1 to GL4 in the LCD device according to the exemplary embodiment. That is, the pixel electrode PE_f rather than the common electrode CE_f may be disposed closer to the first to fourth gate lines GL1 to GL4.

In the LCD device according to the exemplary embodiment described with reference to FIG. 1, the common electrode CE in which a voltage is maintained constant may be interposed between the pixel electrode PE and the first to fourth gate lines GL1 to GL4, and thus the pixel electrode PE and the first to fourth gate lines GL1 to GL4 may not mutually influence each other even when varying voltage values are applied to all of the pixel electrode PE and the first to fourth gate lines GL1 to GL4.

However, in the LCD device according to the exemplary embodiment, since the first to fourth gate lines GL1 to GL4 to which the gate signal having a varying voltage value is provided, and the pixel electrode PE_f to which the data signal having a varying voltage value is provided are adjacent to each other, parasitic capacitance may be generated therebetween. The parasitic capacitance may degrade display quality of the LCD device. In the LCD device according to the exemplary embodiment, the connection relation between the first to fourth gate lines GL1 to GL4 and the first to fourth data lines DL1 to DL4 of a part of pixels is optimized, thereby preventing degradation of display quality.

Specifically, a first pixel PX_1f may be connected to the first data line DL1 and the second gate line GL2, a second pixel PX_2f may be connected to the second data line DL2 and the first gate line GL, a third pixel PX_3f may be connected to the second data line DL2 and the second gate line GL2, a fourth pixel PX_4f may be connected to the third data line DL3 and the second gate line GL2, a fifth pixel PX_5f may be connected to the third data line DL3 and the first gate line GL2, and a sixth pixel PX_6f may be connected to the fourth data line DL4 and the first gate line GL1.

That is, both the first pixel PX_1f and the fourth pixel PX_4f may be connected to the second gate line GL2, and both the second pixel PX_2f and the fifth pixel PX_5f may be connected to the first gate line GL, but the third pixel PX_3f and the sixth pixel PX_6f may be connected respectively to the second gate line GL2 and the first gate line GL1, which are different gate lines.

In this case, a display quality may be improved when both the first pixel PX_1f and the fourth pixel PX_4f are red pixels in which red color filters are disposed, both the second pixel PX_2f and the fifth pixel PX_5f are green pixels in which green color filters are disposed, and both the third pixel PX_3f and the sixth pixel PX_6f are blue pixels in which blue color filters are disposed, for example.

Specifically, since both the first gate line GL1 and the second gate line GL2 are adjacent to the first to sixth pixels PX_1f to PX_6f, parasitic capacitance may be generated between the first and the second gate line GL1 and GL2 and pixel electrodes of the first to sixth pixels PX_1f to PX_6f. Therefore, since a gate signal is provided first to the first gate line GL1 and then a gate signal is provided to the second gate line GL2, voltages charged in the respective pixel electrodes PE_2f, PE_5f and PE_6f of the second, the fifth and the sixth pixels PX_2f, PX_5f and PX_6f controlled by the first gate line GL1 may be dropped by the parasitic capacitance when the signal provided to the second gate line changes.

Although voltages charged in the respective pixel electrodes PE_1f, PE_3f and PE_4f of the first, the third and the fourth pixels PX_1f, PX_3f and PX_4f controlled by the second gate line GL2 might be dropped by a change in the signal of the first gate line GL1, the first, the third and the fourth pixels PX_1f, PX_3f and PX_4f may not be influenced by a voltage drop caused by the first gate line GL1 since the second gate line GL2 starts its operation after completion of an operation of the first gate line GL1.

Thus, when both the first and fourth pixels PX_1f and PX_4f are set to display a red color and connected to the second gate line GL2, both the first and fourth pixels PX_1f and PX_4f may not be influenced by a voltage drop, thereby displaying a red color having the same luminance.

Furthermore, when both the second and fifth pixels PX_2f and PX_5f are set to display a green color and connected to the first gate line GL1, the same degree of voltage drop may occur in the second and fifth pixels PX_2f and PX_5f, thereby displaying a green color having the same luminance.

However, even when both the third and sixth pixels PX_3f and PX_6f are set to display a blue color, the third and sixth pixels PX_3f and PX_6f may be connected respectively to the first gate line GL1 and the second gate line GL2. This is because even when a voltage drop occurs in the sixth pixel PX_6f while no voltage drop is occurring in the third pixel PX_3f, which may result in the blue color with a luminance difference, but the luminance difference in the blue color may not be significantly recognized by the eyes of a user since blue colors have lower visibility than red or green colors.

The connection structure between pixels PX_1f to PX_12f and the gate lines GL1 to GL4 described above may improve display quality of the LCD device.

Transistor (e.g., TR_1f to TR_12f) of the pixels (e.g., PX_1f to PX_12f) may be substantially similar to the transistors TR of the exemplary embodiment of FIGS. 1 to 5, and thereby a detailed description will be omitted Although preferred embodiments of the invention have been described for illustrative purposes, those skilled in the art will appreciate that various modifications, additions and substitutions are possible, without departing from the scope and spirit of the invention as disclosed in the accompanying claims.

What is claimed is:

1. A liquid crystal display device comprising:
   a first gate line and a second gate line extending in a first direction;
   first to fourth data lines extending in a second direction perpendicularly intersecting the first direction; and
   a plurality of pixels connected respectively to one of the first and second gate line and one of the first to fourth data lines;
   wherein each of the plurality of pixels includes a pixel electrode which receives a data signal from the connected one of the first to fourth data lines,
   a region in which the pixel electrode is disposed includes a first domain and a second domain having average alignment directions of liquid crystal molecules different from each other, and
   the first gate line overlaps a boundary between the first domain and the second domain of contiguous pixels extending in the first direction.

2. The liquid crystal display device of claim 1, wherein a plurality of slits is defined in the pixel electrode, and first slits of the plurality of slits defined in the first domain define a first angle relative to the first direction and second slits of the plurality of slits defined in the second domain define a second angle relative to the first direction.

3. The liquid crystal display device of claim 2, wherein third slits of the plurality of slits which define a first similar angle relative to the first direction are further defined in the first domain, and fourth slits of the plurality of slits which define a second similar angle relative to the first direction are further defined in the second domain, and a difference between the first similar angle and the first angle is −20° to 20° and a difference between the second similar angle and the second angle is −20° to 20°.

4. A liquid crystal display device comprising:
   a first gate line and a second gate line extending in a first direction;
   first to fourth data lines extending in a second direction perpendicularly intersecting the first direction;
   a plurality of pixels connected respectively to one of the first and second gate line and one of the first to fourth data lines; and
   first to third color filters overlapping the plurality of pixels,
   wherein each of the plurality of pixels includes a pixel electrode which receives a data signal from the connected one of the first to fourth data lines,
   a region in which the pixel electrode is disposed includes a first domain and a second domain having average alignment directions of liquid crystal molecules different from each other,
   the first gate line overlaps a boundary between the first domain and the second domain, and the plurality of pixels includes first to sixth pixels disposed sequentially in the first direction, and the first color filter overlaps the first and fourth pixels, the second color filter overlaps the second and fifth pixels, and the third color filter overlaps the third and sixth pixels.

5. The liquid crystal display device of claim 4, wherein the first and fourth pixels are connected to the second gate line, the second and fifth pixels are connected to the first gate line, and one of the third pixel or the sixth pixel is connected to the first gate line and the other of the third pixel and the sixth pixel is connected to the second gate line.

6. The liquid crystal display device of claim 5, wherein the third color filter passes light having a wavelength band of a blue color.

7. The liquid crystal display device of claim 5, wherein the first data line is disposed at one side of the first pixel opposite to the first direction, the second data line is interposed between the second pixel and the third pixel, the third data line is interposed between the fourth pixel and the fifth pixel, and the fourth data line is disposed at one side of the sixth pixel in the first direction.

8. The liquid crystal display device of claim 7, wherein the first data line is connected to the first pixel, the second data line is connected to the second and third pixels, the third data line is connected to the fourth and fifth pixels, and the fourth data line is connected to the sixth pixel.

9. The liquid crystal display device of claim 7, wherein the second data line is connected to the first and second pixels, the third data line is connected to the third and fourth pixels, and the fourth data line is connected to the fifth and sixth pixels.

10. The liquid crystal display device of claim 9, further comprising a second connection wire interconnecting the second data line and the first pixel, a third connection wire interconnecting the third data line and the third pixel, and a fourth connection wire interconnecting the fourth data line and the fifth pixel.

11. The liquid crystal display device of claim 9, wherein the data signal having a first polarity is provided to the second and fourth data lines, and the data signal having a second polarity is provided to the third data line.

12. The liquid crystal display device of claim 1, wherein the plurality of pixels further includes a plurality of thin film transistors including one of the first gate line and the second gate line as a control terminal, one of the first to fourth data lines as an input terminal, and pixel electrodes of the plurality of pixels as an output terminal, and the plurality of thin film transistors including the first gate line as the control terminal are disposed at one side of the first gate line in the second direction.

13. The liquid crystal display device of claim 1, further comprising a light blocking member overlapping the second gate line, and the second gate line does not overlap the pixel electrodes of the plurality of pixels.

14. The liquid crystal display device of claim 13, wherein a width of the light blocking member in the second direction is equal to or less than 11 micrometers.

15. The liquid crystal display device of claim 13, wherein the light blocking member does not overlap the boundary between the first domain and the second domain.

16. The liquid crystal display device of claim 15, wherein the light blocking member is disposed in a region in which the first gate line and the first to fourth data lines overlap each other.

17. The liquid crystal display device of claim 2, wherein the first angle and the second angle are symmetrical to each other with reference to a straight line extending in the second direction.

18. A liquid crystal display device comprising:
a plurality of gate lines extending in a first direction;
a plurality of data lines extending in a second direction perpendicularly intersecting the first direction; and
a plurality of pixels connected respectively to the plurality of gate lines and the plurality of data lines;
wherein the plurality of pixels include pixel electrodes which receive data signals from the plurality of data lines,
a region in which the pixel electrodes are disposed includes a first domain and a second domain having average alignment directions of liquid crystal molecules different from each other, and
at least one of the plurality of gate lines overlaps a boundary between the first domain and the second domain of contiguous pixels extending in the first direction.

19. The liquid crystal display device of claim 18, wherein a plurality of slits is defined in the pixel electrodes, and first slits of the plurality of slits defined in the first domain define a first angle relative to the first direction and second slits of the plurality of slits defined in the second domain define a second angle relative to the first direction.

20. The liquid crystal display device of claim 19, wherein third slits which define a first similar angle relative to the first direction are further defined in the first domain, and fourth slits which define a second similar angle relative to the first direction are further defined in the second domain, and a difference between the first similar angle and the first angle is −20° to 20° and a difference between the second similar angle and the second angle is −20° to 20°.

21. The liquid crystal display device of claim 18, wherein the plurality of pixels is disposed in m numbers in the second direction, and the plurality of data lines are connected respectively to 2m numbers of pixels where m is a natural number.

22. The liquid crystal display device of claim 21, wherein the plurality of pixels are disposed in n numbers in the first direction, and the plurality of gate lines are connected respectively to n/2 numbers of pixels where n is a natural number.

23. The liquid crystal display device of claim 18, further comprising a light blocking member overlapping a part of the plurality of gate lines, wherein the light blocking member overlaps the gate line in a region except for the boundary between the first domain and the second domain.

24. The liquid crystal display device of claim 18, wherein a single gate line of the plurality of gate lines is interposed between the pixel electrodes adjacent to each other in the second direction.

* * * * *